United States Patent
Azimi et al.

(10) Patent No.: US 7,791,368 B2
(45) Date of Patent: Sep. 7, 2010

(54) METHOD AND APPARATUS FOR REGULATING A POWER SUPPLY OF AN INTEGRATED CIRCUIT

(75) Inventors: Kouros Azimi, Center Valley, PA (US); Mohammad S. Mobin, Orefield, PA (US); Gregory W. Sheets, Breinigsville, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 44 days.

(21) Appl. No.: 12/012,733

(22) Filed: Feb. 5, 2008

(65) Prior Publication Data

US 2008/0191669 A1    Aug. 14, 2008

Related U.S. Application Data

(60) Provisional application No. 60/899,684, filed on Feb. 6, 2007.

(51) Int. Cl.
*H03K 17/16* (2006.01)
*H03K 19/003* (2006.01)

(52) U.S. Cl. .............................. 326/33; 326/32; 326/34
(58) Field of Classification Search .................. 326/30, 326/32–34, 87
See application file for complete search history.

(56) References Cited

U.S. PATENT DOCUMENTS

| | | | |
|---|---|---|---|
| 5,155,380 A | 10/1992 | Hwang et al. | |
| 5,208,557 A | 5/1993 | Kersh, III | |
| 5,999,009 A | 12/1999 | Mitsui | |
| 6,020,781 A | 2/2000 | Fujioka | |
| 6,097,113 A | 8/2000 | Teraoka et al. | |
| 6,100,768 A | 8/2000 | Hirayama | |
| 6,127,862 A * | 10/2000 | Kawasumi | 327/112 |
| 6,166,577 A | 12/2000 | Mizuno et al. | |
| 6,222,354 B1 * | 4/2001 | Song | 323/273 |
| 6,310,928 B1 | 10/2001 | Yunome | |
| 6,437,610 B1 * | 8/2002 | Schrodinger | 327/108 |
| 6,466,077 B1 | 10/2002 | Miyazaki et al. | |
| 6,535,013 B2 | 3/2003 | Samaan | |
| 6,560,164 B2 | 5/2003 | Kawai et al. | |
| 6,774,666 B1 | 8/2004 | Samad | |
| 6,980,053 B2 | 12/2005 | Caresosa et al. | |
| 7,053,679 B2 | 5/2006 | Rho | |
| 7,061,337 B2 | 6/2006 | Partovi et al. | |
| 7,301,366 B1 | 11/2007 | Devnath et al. | |
| 7,321,254 B2 | 1/2008 | Li et al. | |
| 2002/0017946 A1 | 2/2002 | Fujii et al. | |

(Continued)

OTHER PUBLICATIONS

"PWM DC/DC Voltage Regulator Controller," Intersil Americas Inc., ISL62870, Data Sheet, FN6708.0, Aug. 14, 2008, pp. 1-16.

(Continued)

*Primary Examiner*—Anh Q Tran
(74) *Attorney, Agent, or Firm*—Mendelsohn, Drucker & Associates, P.C.; David L. Cargille; Steve Mendelsohn

(57) ABSTRACT

Disclosed is a circuit for adjusting a voltage supplied to an IC by a power supply. The circuit includes a PVT detector configured to generate a control signal and an adjustable resistance device configured to adjust its resistance in response to the control signal.

23 Claims, 4 Drawing Sheets

U.S. PATENT DOCUMENTS

| | | |
|---|---|---|
| 2003/0122572 A1* | 7/2003 | Ajit ............................. 326/30 |
| 2004/0012449 A1 | 1/2004 | Illegems |
| 2005/0146965 A1* | 7/2005 | Kim et al. .................. 365/211 |
| 2005/0195005 A1 | 9/2005 | Choi et al. |
| 2005/0218871 A1 | 10/2005 | Kang et al. |
| 2006/0132243 A1 | 6/2006 | Yamanaka et al. |
| 2007/0018713 A1 | 1/2007 | Tripathi et al. |
| 2007/0018864 A1 | 1/2007 | Khan et al. |
| 2007/0194768 A1 | 8/2007 | Bansal et al. |
| 2007/0210832 A1 | 9/2007 | Abel et al. |

OTHER PUBLICATIONS

"PWM DC/DC Controller With VID Inputs For Portable GPU Core-Voltage Regulator," Intersil Americas Inc., ISL62871, ISL62872, Data Sheet, FN6707.0, Aug. 14, 2008, pp. 1-25.

* cited by examiner

METHOD AND APPARATUS FOR REGULATING A POWER SUPPLY OF AN INTEGRATED CIRCUIT This application claims the benefit of U.S. Provisional Application No. 60/899,684 filed Feb. 6, 2007, which is incorporated herein by reference.

BACKGROUND OF THE INVENTION

The present invention relates generally to integrated circuits (ICs) and more specifically to the regulating of a power supply of an IC.

Integrated circuits (ICs) typically include many switching elements, such as transistors. These switching elements are configured to perform a variety of circuit functions.

The operation of a transistor is typically affected by its process, voltage, and temperature ("PVT"). The "process" component of PVT refers to the process of manufacturing a transistor. The process is often classified as "fast", "slow", "nominal", or anywhere in between. A transistor manufactured using a fast process will transmit signals at a faster rate as compared to a transistor manufactured using a slower process. Likewise, a transistor manufactured using a slow process will transmit signals at a slower rate as compared to a transistor manufactured using a faster process. Once a transistor is manufactured using a particular process, the effect of the process is fixed. Thus, the "process" component of PVT cannot be adjusted to change the operating characteristics of a manufactured transistor.

The "temperature" component of PVT is the temperature at which the transistor operates. Similar to the process used to manufacture a transistor, the temperature at which a transistor operates affects how a transistor operates. In particular, the rate at which a transistor transmits a signal is affected by the temperature at which the transistor operates. For example, a transistor operating at a reference temperature requires a first voltage to transmit signals at a first rate. If the temperature of the transistor decreases, less voltage is needed to transmit signals at the first rate. Similarly, if the temperature of the transistor increases, more voltage is needed to transmit signals through the transistor at the first rate. The "temperature" component of PVT varies during operation of the transistor. While there is some control over the temperature of an IC, such temperature cannot be sufficiently adjusted to result in a change in its operating characteristics.

The only component of PVT that can be varied effectively during operation to adjust a transistor's characteristics is its voltage. The optimum supply voltage of a transistor varies depending on the transistor's process (e.g., fast or slow) and the transistor's operating temperature. A conventional solution to the variation in the optimum supply voltage is to set the supply voltage to a worst-case value. In transistors manufactured with a fast process or operating at a low temperature, this conventional solution often results in too much power being supplied to the transistor, with the excess power being dissipated.

As an example, if a circuit designer determines (e.g., via simulation of an IC having many transistors) that a transistor manufactured with a slow process needs 3.2 V as a supply voltage, the circuit designer may provide a supply voltage of 3.2 V to each transistor on the IC. If another transistor on the IC was manufactured with a fast process, however, that transistor may only need a supply voltage of 3.0 V. When 3.2 V is supplied, excess power is dissipated on the transistor that only needs 3.0 V as a supply voltage. As the number of transistors on the IC that were manufactured with a fast process (or are operating at a low temperature) increases, the amount of dissipated power increases.

Increased power dissipation on an IC often corresponds to an increase in IC component cost because increased packaging requirements have to be satisfied. This additional packaging results in increased cost for the IC. Also, increased power dissipation often decreases reliability of the IC.

Typically, a power supply (also referred to herein as a voltage regulator) can be adjusted to provide a particular voltage to an IC. One technique for adjusting a power supply is the use of resistors connected to the power supply. Like the power supply itself, these resistors are typically located external to the IC. Adjusting the power supply via resistors can be difficult to perform by the manufacturer of the IC because the manufacturer of the IC may not have control over the values of the resistors that are used to adjust the power supply. As a result, the manufacturer of the IC may rely on another party to make the adjustment, such as designers of a system including the power supply and the IC.

Therefore, there remains a need to adjust, via internal components of an IC, the voltage applied to the IC by an external power supply.

BRIEF SUMMARY OF THE INVENTION

In accordance with an embodiment of the present invention, a circuit for adjusting a voltage supplied to an IC by a power supply includes a PVT detector configured to generate a control signal and an adjustable resistance device connected to the power supply and the PVT detector. The adjustable resistance device is configured to adjust its resistance in response to the control signal.

The adjustable resistance device may include a resistor connected to a first switch and a second switch. When the first switch is closed, the resistor is connected to a maximum voltage. When the second switch is closed, the resistor is connected to a minimum voltage. The first and second switches are opened or closed in response to the control signal.

The adjustable resistance device may alternatively include a first plurality of resistors and a second plurality of resistors. Each resistor in the first plurality is connected to a switch and each resistor in the second plurality is connected to a switch. When a switch connected to a resistor in the first plurality is closed, that resistor is connected to a maximum voltage. When a switch connected to a resistor in the second plurality is closed, that resistor is connected to a minimum voltage. The switches are opened or closed in response to the control signal.

In another embodiment, the adjustable resistance device includes at least one active element.

These and other advantages of the invention will be apparent to those of ordinary skill in the art by reference to the following detailed description and the accompanying drawings.

DETAILED DESCRIPTION

Figure 1:
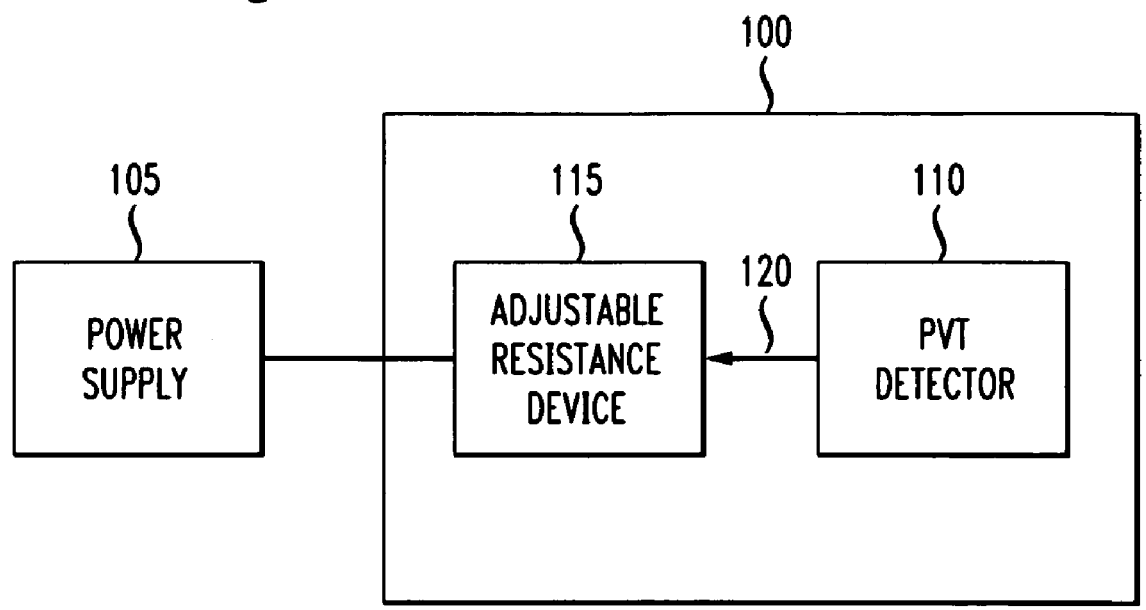
FIG. 1 is a block diagram of a system having a power supply connected to an IC having an adjustable resistance device and a PVT detector in accordance with an embodiment of the present invention.

FIG. 1 is a block diagram of an integrated circuit (IC) 100 in communication with an external power supply 105. The IC 100 includes a PVT detector 110 to detect the process, voltage, and/or temperature (PVT) characteristics of transistors on the IC 100. For example, the PVT detector 110 can detect whether a transistor on the IC 100 was manufactured via a fast process or via a slow process. As is known to one of ordinary skill in the art, the PVT detector 110 can perform this detection in a variety of ways.

The PVT detector 110 adjusts the resistance of an adjustable resistance device 115 which is internal to the IC 100. The PVT detector 110 adjusts the resistance of the device 115 by generating and transmitting a control signal 120 to the adjustable resistance device 115. The resistance of the adjustable resistance device 115 is adjusted in response to the control signal 120 in order to affect the voltage received from the power supply 105. As described in more detail below, the adjustable resistance device 115 can include, for example, a configuration of one or more resistors and/or a configuration of active elements.

Figure 2:
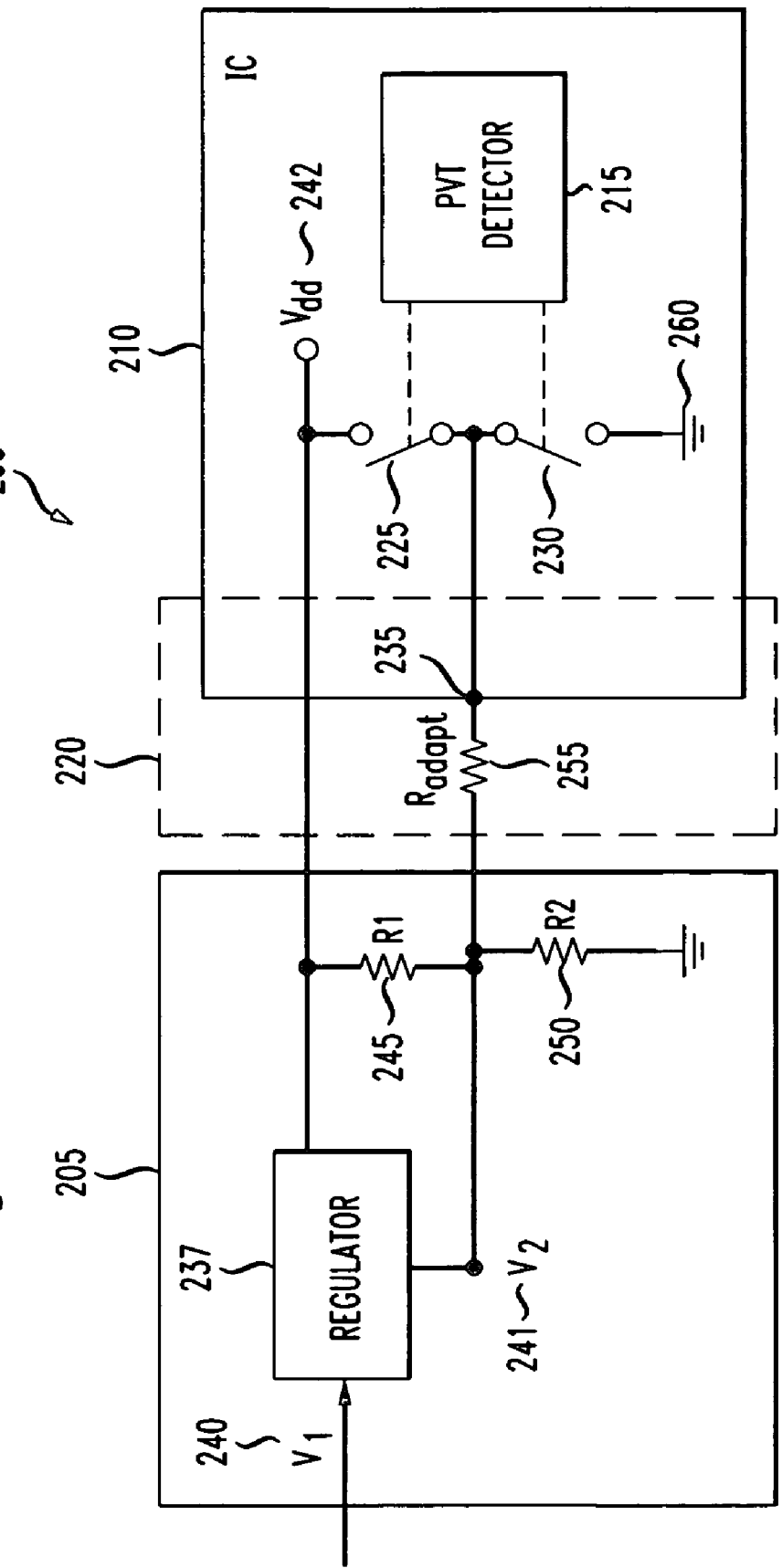
FIG. 2 is a block diagram of a system illustrating an embodiment of the adjustable resistance device of FIG. 1.

One embodiment of an adjustable resistance device is shown in FIG. 2. System 200 includes a power supply 205 in communication with IC 210. The IC 210 includes PVT detector 215, which adjusts the resistance of the resistive network formed by adjustable resistance device 220 (shown with dashed lines), resistor R1 245, and resistor R2 250. This results in a change in the voltage provided by the power supply 265.

The PVT detector 215 controls the resistance of the resistive network formed by the adjustable resistance device 220, resistor R1 245, and resistor R2 250 by controlling the opening and closing of switches 225, 230. The PVT detector 215 adjusts the resistance by controlling the switches 225, 230. This change in resistance effectively adjusts the voltage provided by the power supply 205 to the IC 210.

Power supply 205 includes a regulator 237 which regulates an input voltage $V_1$ 240 to produce a voltage $V_2$ 241 with respect to a maximum voltage $V_{dd}$ 242 and a minimum voltage (e.g., ground). The power supply 205 further includes a resistor R1 245 and a resistor R2 250. Resistor R1 245 and a resistor R2 250 form a voltage divider with a load resistor $R_{adapt}$ 255. The configuration of R1 245 and R2 250 with load resistor $R_{adapt}$ 255 causes regulator 237 to provide a different voltage to the IC 210.

The voltage at circuit point 241 depends on the value of the load resistor $R_{adapt}$ 255. This voltage is adjusted based on the configuration of the switches 225, 230. Specifically, if switch 230 is closed and switch 225 is open, then the formula for the voltage at circuit point 241 of the system 200 is:

$$\frac{V_{dd}(R2 \| R_{adapt})}{(R1 + R2 \| R_{adapt})}$$

where $$R2 \| R_{adapt} = \frac{(R2)(R_{adapt})}{R2 + R_{adapt}}.$$

If switch 230 is open and switch 225 is closed, then the formula for the voltage at circuit point 241 of the system 200 is:

$$\frac{V_{dd}(R2)}{(R1 \| R_{adapt}) + R2}$$

where $$R1 \| R_{adapt} = \frac{(R1)(R_{adapt})}{R1 + R_{adapt}}.$$

Thus, when switch 225 is closed and switch 230 is open, the circuit point 235 and, therefore, the resistor $R_{adapt}$ 255 is connected to maximum voltage $V_{dd}$ 242. When switch 230 is closed and switch 225 is open, the circuit point 235 and, therefore, the resistor $R_{adapt}$ 255 is connected to minimum voltage (e.g., ground) 260.

If the PVT detector 215 determines that the voltage being supplied to transistors on the IC 210 is resulting in excess power being dissipated, then the voltage at circuit point 235 needs to be decreased. As a result, the PVT detector 215 closes switch 230 and opens switch 225. If the PVT detector 215 determines that the voltage being supplied to transistors on the IC 210 is too low, then the voltage at circuit point 235 needs to be increased. As a result, the PVT detector 215 closes switch 225 and opens switch 230. As described above, the PVT detector 215 can determine the voltage supplied to the transistors on the IC 210 in a variety of ways known to one of ordinary skill in the art.

For example, the detector 215 may determine that the voltage at circuit point 235 needs to be increased when the detector 215 determines that the process used to generate some or all of the transistors on the IC 210 was a slow process. In another embodiment, the detector 215 determines that the voltage at circuit point 235 needs to be increased when the detector 215 determines that the temperature of one or more transistors on the IC 210 is increasing.

Figure 3:
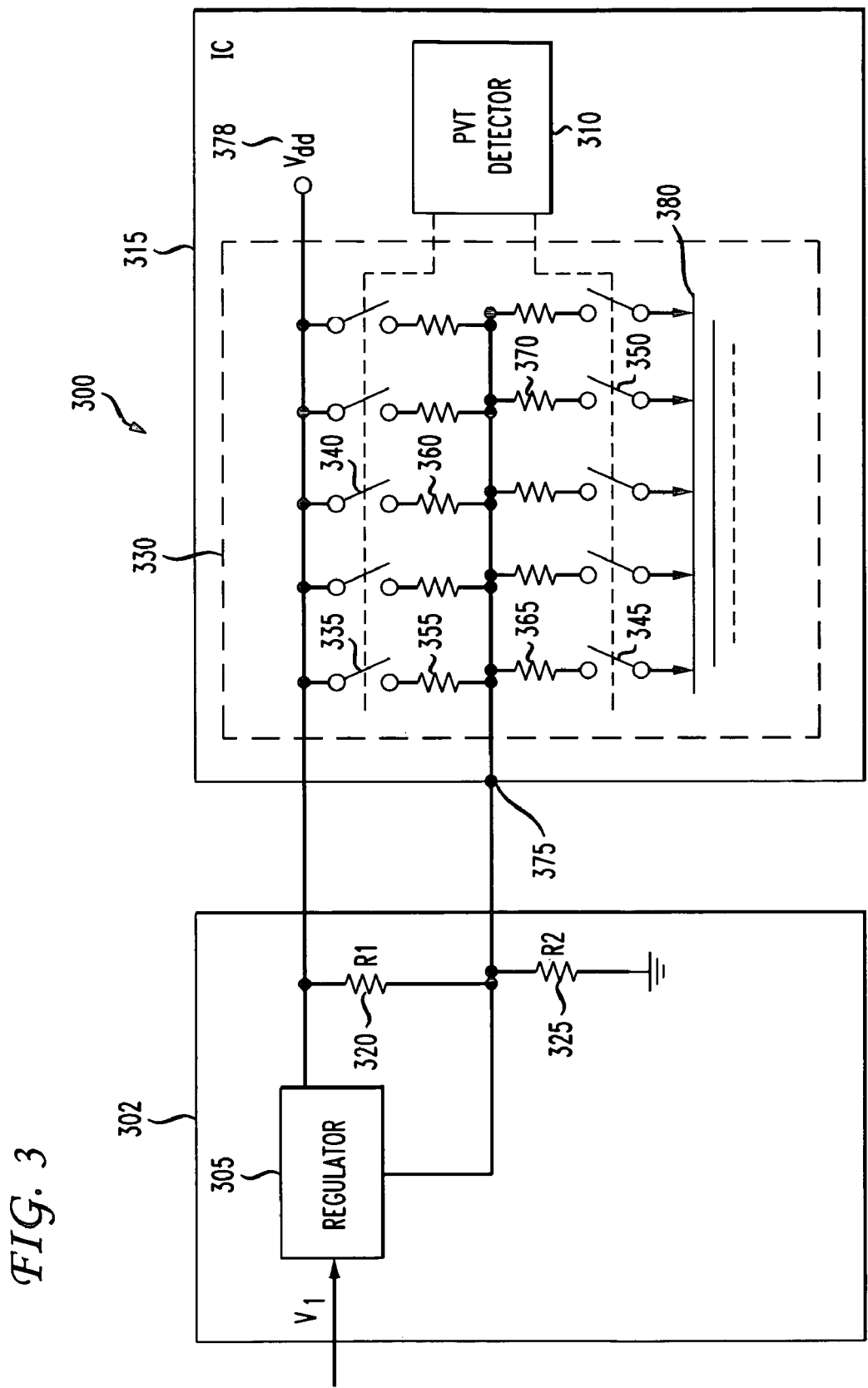
FIG. 3 is a block diagram of a system illustrating another embodiment of the adjustable resistance device of FIG. 1.

Another embodiment of an adjustable resistance device is shown in FIG. 3. System 300 includes an external power supply 302 (with voltage regulator 305) and PVT detector 310 which is internal to an IC 315. System 300 includes a first resistor R1 320 and a second resistor R2 325. These two resistors R1 320 and R2 325 form a voltage divider with the resistance of adjustable resistance device 330 internal to the IC 315.

Adjustable resistance device 330 includes a plurality of switches, such as switches 335, 340, 345, 350, connected to a plurality of resistors, such as resistors 355, 360, 365, 370. Adjustable resistance device 330 enables a finer control relative to adjustable resistance device 220 of FIG. 2 because a plurality of resistors can be connected in parallel to adjust the resistance at circuit point 375. For example, switches 335 and 340 can be turned on to connect resistors 355 and 360 in parallel to a maximum voltage $V_{dd}$ 378 and to circuit point 375. Further, switches 345 and 350 can be turned on to connect resistors 365 and 370 in parallel to a minimum voltage (e.g., ground) 380 and to circuit point 375. The PVT detector 310 is coupled to the switches of the adjustable resistance device 330.

The PVT detector 310 controls switches so that one or more of the resistors that can be connected to maximum voltage $V_{dd}$ 378, such as resistors 355 and 360, are connected to maximum voltage $V_{dd}$ when the PVT detector 310 determines that the voltage being input into the IC needs to be increased. The PVT detector 310 control switches so that one or more of the resistors that can be connected to minimum voltage 380, such as resistors 365 and 370, are connected to minimum voltage 380 when the PVT detector 310 determines that the voltage being input into the IC needs to be decreased.

Figure 4:
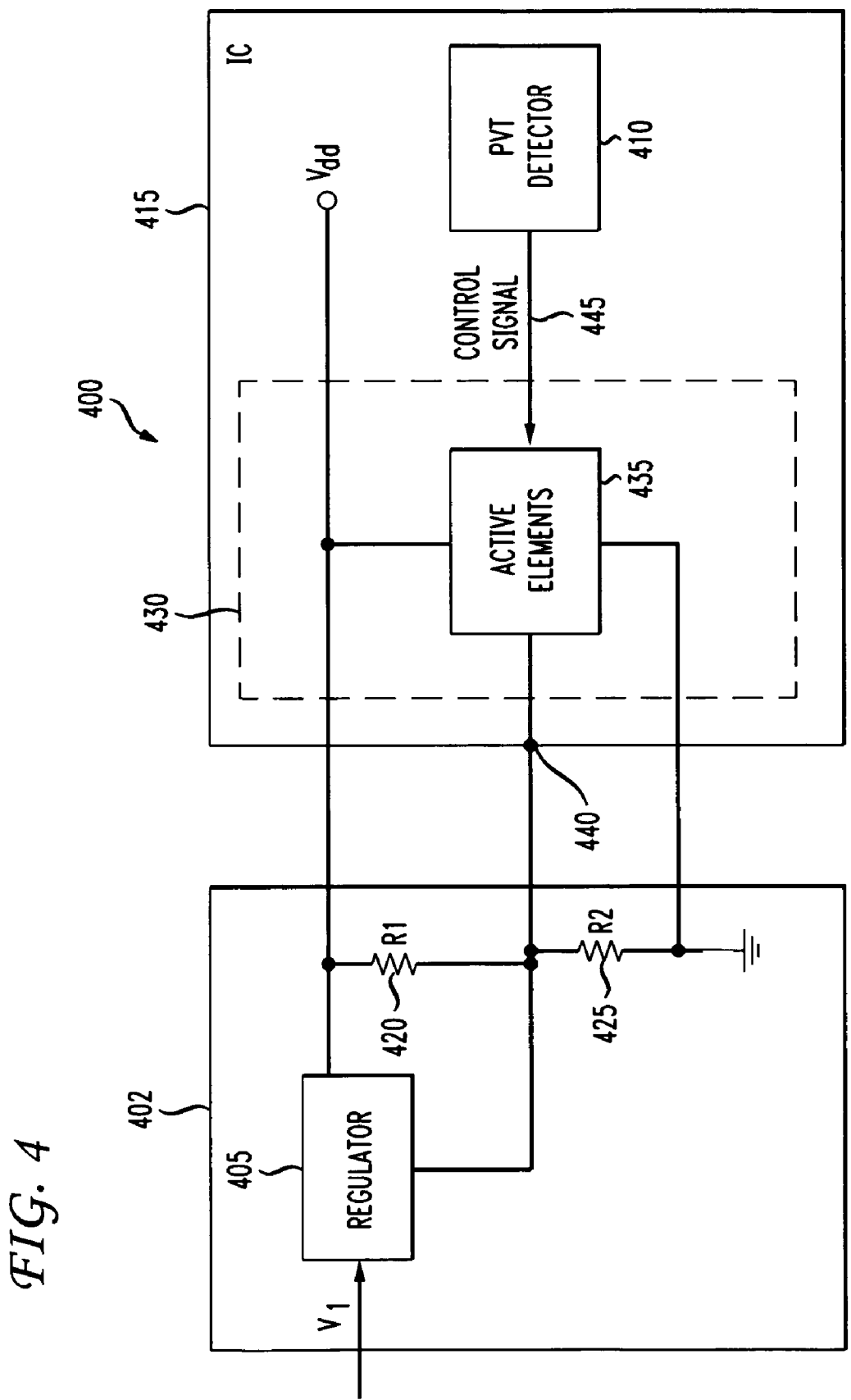
FIG. 4 is a block diagram of a system illustrating another embodiment of the adjustable resistance device of FIG. 1.

Another embodiment of an adjustable resistance device is shown in FIG. 4. System 400 includes an external power supply 402 (with voltage regulator 405) being controlled by a PVT detector 410 which is internal to an IC 415. System 400 includes a first resistor R1 420 and a second resistor R2 425. These two resistors R1 420 and R2 425 form a voltage divider with adjustable resistance device 430 internal to the IC 415.

Adjustable resistance device 430 includes one or more active elements 435, such as Metal Oxide Semiconductor (MOS) devices. The active elements 435 provide a finer control of the resistance at circuit point 440 of the IC 415 than the previously described embodiments. Specifically, the active elements 435 provide a resistance that is not limited to discrete resistances.

PVT detector 410 controls the resistance of the adjustable resistance device 430 by transmitting a control signal 445 to the active elements 435. In response to the control signal 445, the active elements 435 adjust how they are turned on or off in order to adjust the resistance of the device 430. For example, the active elements 435 may be turned on or off a particular amount based on the control signal 445. The control signal 445 is based on one or more PVT characteristics of transistors on the IC 415.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

The invention claimed is:

1. A circuit for adjusting a voltage supplied to an integrated circuit (IC) by a power supply comprising:
   a PVT detector configured to generate a control signal based on a detection of at least one of process, voltage, and temperature of at least one switching element on said IC; and
   an adjustable resistance device connected to said power supply and said PVT detector, and configured to adjust its resistance in response to said control signal, wherein adjusting the resistance of the adjustable resistance device adjusts the voltage provided by the power supply to said IC.

2. The circuit of claim 1 wherein said adjustable resistance device comprises a resistor connected to a first switch and a second switch.

3. The circuit of claim 2 wherein said first switch connects said resistor to a maximum voltage when said first switch is closed.

4. The circuit of claim 2 wherein said second switch connects said resistor to a minimum voltage when said second switch is closed.

5. The circuit of claim 2 wherein said first and second switches are controlled in response to said control signal.

6. The circuit of claim 1 wherein said adjustable resistance device comprises a first plurality of resistors, each connected to a switch.

7. The circuit of claim 6 wherein said each of said first plurality of resistors is connected to a maximum voltage when its switch is closed.

8. The circuit of claim 6 wherein said adjustable resistance device comprises a second plurality of resistors, each connected to a switch.

9. The circuit of claim 8 wherein said each of said second plurality of resistors is connected to a minimum voltage when its switch is closed.

10. The circuit of claim 1 wherein said adjustable resistance device comprises at least one active element.

11. A method for adjusting a voltage supplied to an integrated circuit (IC) by a power supply comprising:
    detecting at least one of process, voltage, and temperature of at least one switching element on said IC;
    generating a control signal based on said detecting; and
    adjusting the resistance of an adjustable resistance device in response to said control signal wherein adjusting the resistance of the adjustable resistance device adjusts the voltage provided by the power supply to said IC.

12. The circuit of claim 11 wherein adjusting the resistance of the adjustable resistance device comprises connecting at least one resistor in parallel with a plurality of resistors connected to said power supply to a maximum voltage in response to said control signal.

13. The circuit of claim 11 wherein adjusting the resistance of the adjustable resistance device comprises connecting at least one resistor in parallel with a plurality of resistors connected to said power supply to a minimum voltage in response to said control signal.

14. The circuit of claim 11 wherein adjusting the resistance of the adjustable resistance device comprises turning on at least one active element an amount in response to said control signal.

15. The circuit of claim 11 wherein adjusting the resistance of the adjustable resistance device comprises turning off at least one active element an amount in response to said control signal.

16. A circuit for adjusting a voltage supplied to an integrated circuit (IC) by a power supply comprising:
    means for detecting at least one of process, voltage, and temperature of at least one switching element on said IC;
    means for generating a control signal based on said detecting; and
    means for adjusting the resistance of an adjustable resistance device in response to said control signal, wherein adjusting the resistance of the adjustable resistance device adjusts the voltage provided by the power supply to said IC.

17. The circuit of claim 16 wherein said means for adjusting comprises means for connecting at least one resistor in parallel with a plurality of resistors connected to said power supply to a maximum voltage in response to said control signal.

18. The circuit of claim 16 wherein said means for adjusting comprises means for connecting at least one resistor in parallel with a plurality of resistors connected to said power supply to a minimum voltage in response to said control signal.

19. The circuit of claim 16 wherein said means for adjusting comprises means for turning on at least one active element an amount in response to said control signal.

20. The circuit of claim 16 wherein said means for adjusting comprises means for turning off at least one active element an amount in response to said control signal.

21. The circuit of claim 1, wherein both said PVT detector and at least one element of said adjustable resistance device are internal to said IC.

22. The method of claim 11, wherein:

said detecting at least one of process, voltage, and temperature of at least one switching element on said IC is performed by a PVT detector that is internal to said IC, and said adjusting the resistance of said adjustable resistance device is performed by an adjustable resistance device that is internal to said IC.

23. The circuit of claim 1, wherein both said means for detecting and said means for adjusting the supply voltage of said IC are internal to said IC.

* * * * *